United States Patent Office 3,410,812
Patented Nov. 12, 1968

---

3,410,812
PHOSPHOROUS CONTAINING POLYESTERS
Ulrich Bahr, Leverkusen, Günter Oertel, Cologne-Flittard, and Günter Nischk and Manfred Dahm, Leverkusen, Germany, assignors to Farbenfabriken Bayer Aktiengesellschaft, Leverkusen, Germany, a German corporation
No Drawing. Filed May 8, 1962, Ser. No. 193,311
Claims priority, application Germany, May 10, 1961, F 33,896
11 Claims. (Cl. 260—2.5)

ABSTRACT OF THE DISCLOSURE

Polyesters prepared by reacting a dialkyl phosphite with an unsaturated alkyd resin containing a plurality of hydroxyl groups and polyurethane plastics prepared by reacting these phosphite polyols with organic polyisocyanates.

---

This invention relates to polyesters and more particularly, to polyesters which are particularly adapted for the production of flame-resistant plastic and especially polyurethane plastics.

Flame-retardant palstics have been prepared heretofore by including monomeric phosphorous compounds in the plastic composition for the purpose of imparting flame-resistant properties thereto. The monomeric compounds however, tend to exude from the plastics during storage under conditions where the monomeric compounds are incompatible with the polymer. Thus, for example, under pressure or at elevated temperatures, the polymer loses the flame-retarding effect of the monomeric substance.

Another method of producing flame-retardant plastics is to include the phosphorous in the molecule of the polymer by chemical bonds. For example, it is known to prepare polyesters from tetrachlorophthalic acid or phosphoric acid by reacting these components together with polycarboxylic acids and polyhydric alcohols. The resulting chemically homogeneous substance has good flame-retarding properties but poor physical properties. The plastics are often undesirably brittle and their field of application is limited to those areas where brittleness is not a disadvantage.

It has also been proposed heretofore to prepare polyesters based on dialkyl phosphites, polyhydric alcohols and polycarboxylic acids which may or may not contain aliphatic unsaturation. These materials represent an improvement over the above-defined monomers and the compounds containing chemically combined chlorine, phosphorous and the like because they have improved physical properties and do not lose the beneficial flame-retarding effect on storage. In these polyesters, the dialkyl phosphite reacts by ester interchange with the hydroxyl groups in the reaction mixture and becomes fastened directly into the chain. This has many advantages over the prior art process but still leaves something to be desired in the final products of plastics based on these polyesters.

It is therefore an object of this invention to provide still further improved hydroxyl polyesters and plastics based on them which contain chemically combined phosphorous. Another object of this invention is to provide hydroxyl polyesters suitable for the preparation of flame-resistant plastics which contain chemically combined phosphorous as an appendage and not only linked into the chain. A further object of this invention is to provide a catalyst for the production of polyesters containing chemically combined phosphorous. Still another object of this invention is to provide flame-resistant polyurethane plastics. A further object of this invention is to provide a method of making flame-resistant plastics by polymerization of polyesters with polymerizable substances through unsaturated copolymerization reactions. Still another object of this invention is to provide cellular polyurethane plastics suitable for use as insulation and the like which have good flame-retarding properties.

The foregoing objects and others which will become apparent from the following description are accomplished in accordance with the invention, generally speaking, by providing polyesters and plastics prepared therefrom which are prepared by reacting alcohols, carboxylic acids and dialkyl phosphites or polyesters prepared from alcohols and carboxylic acids including naturally occurring polyesters with dialkyl phosphites in the presence of a catalyst which will cause the addition of a dialkyl phosphite to an ethylenically unsaturated double bond. Of course, there must be some ethylenic unsaturation in the polyester, the alcohol, the acid or in the naturally occurring polyester. If the polyester is to be used for the preparation of polyurethane plastics, then it should be hydroxyl terminated and it should be prepared from a polycarboxylic acid and a polyhydric alcohol, at least one of which is ethylenically unsaturated. If the polyester is to be used for the preparation of copolymers, for example with ethylenically unsaturated compounds, then there should be less than a stoichiometric amount of dialkyl phosphite reacted with the ethylenically unsaturated double bonds. It is preferred to prepare hydroxyl polyesters which are used for the preparation of polyurethane plastics and indeed it is the polyesters which are especially adapted for the preparation of polyurethane plastics which find the greatest utility and which serve to best advantage to produce plastics which have unharmed physical properties. Any suitable dialkyl phosphite may be used but those having the formula

wherein R is a lower alkyl radical preferably having from 1 to 5 carbon atoms give the best results. Suitable compounds are, for example, dimethyl phosphite, diethyl phosphite, dipropyl phosphite, dibutyl phosphite, dipentyl phosphite, methyl ethyl phosphite, ethyl butyl phosphite and the like.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, muconic acid, alpha-hydromuconic acid, beta-hydromuconic acid, citraconic acid, mesaconic acid, itaconic acid, alpha-butyl-alpha-ethyl glutaric acid, alpha,beta-diethyl succinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 2,5 - dimethyl - 3 - hexene - 2,5-diol, 3,6-dimethyl-4-octene-3,6-diol, 1,4-pentane diol, 1,3-pentane diol, 1,6-hexane diol, hexene-1,6-diol, 1,7-heptane diol, diethylene glycol, 1,2-butylene glycol, butene-1,4-diol, 1,5-pentane triethanol amine, pentaerythritol, sorbitol and the like. In addition to the polycarboxylic acids and polyhydric alcohols, especially where the polyesters are made from ethylenically unsaturated components so that they may be further polymerized, monocarboxylic acids and/or monohydric alcohols may also be used such as lauric acid, stearic acid, ricinoleic acid, benzoic acid, oleic acid, and the like and/or butanol, pentanol, allyl alcohol, methallyl alcohol and the like.

In addition, one may aso use the corresponding acid chlorides, acid anhydrides, epoxides or lower alkyl esters of the acids or alcohols set forth above providing they are capable of forming an ester.

Any suitable naturally occurring polyester may be used such as, for example, castor oil and the like. Any suitable catalyst which will cause the addition of a dialkyl phosphite to an ethylenically unsaturated double bond may be used, such as basic or radical forming catalysts, for example, sodium ethylate, potassium ethylate, sodium tertiary butylate, tertiary amines such as triethylamine, N-methyl piperidine, organic peroxides such as benzoyl peroxide, ditertiary butyl peroxide and the like, and azoisobutyric acid dinitrile.

The preparation of the phosphorous containing polyesters may be carried out in a straightforward and convenient manner by combining the polyhydric alcohol, polycarboxylic acid and dialkyl phosphite in the presence of a catalyst which will cause the addition of a dialkyl phosphite to an ethylenically unsaturated double bond or the polyester may be prepared in a first step employing such proportions of polyhydric alcohol and polycarboxylic acid so that the polyester has terminal hydroxyl groups and then reacting the resulting hydroxyl terminated polyester with a dialkyl phosphite to prepare the polyesters of the invention. The phosphite is preferably used in such a quantity that the final polyester contains from about 0.1 percent to about 10 percent by weight of phosphorous. More than about 10 percent by weight of phosphorous may be used but it is preferred to use less than this amount since the advantageous phyiscal properties of the plastics prepared from the polyesters fall off with increased amounts of phosphorous. Even amounts of phosphorous less than 2 percent by weight impart significant flame-resistant properties to the plastics prepared from these polyesters and particularly the polyurethane plastics. The reaction takes place between the unsaturation of the polyester or components thereof and the alkoxy group of the dialkyl phosphite.

The addition may take place at room temperature (20° C.) or at slightly elevated temperatures of up to about 50° C. With less active double bonds, temperatures of about 80° C. to about 120° C. may be required. The choice of the catalyst depends somewhat on the activity of the double bonds. The quantity of catalyst is preferably about 1 percent to about 10 percent by weight calculated on the weight of the dialkyl phosphite. If it is desired to saturate all the double bonds of the unsaturated polyester by means of dialkyl phosphites, one uses quantities of dialkyl phosphites equivalent to the number of the double bonds or alternatively, an excess of dialkyl phosphite might be used, in which case the reaction takes place more rapidly. The unreacted excess may be removed for example by distilling off in vacuo. If only a portion of the double bonds are to be saturated by dialkyl phosphite, a correspondingly smaller quantity is used. The flame-resistance may be increased by adding a halogen such as chlorine or bromine in the usual manner to the remaining double bonds.

Polyurethane plastics may be prepared from the polyesters as pointed out above including, for example, cellular or noncellular polyurethane plastics. The polyesters for the preparation of polyurethane plastics should preferably have a molecular weight between about 500 and about 10,000 with corresponding hydroxyl numbers and acid numbers for difuctional or higher polyfuctional, preferably polyhydroxyl polyesters. Best results are obtained where the polyester has an hydroxyl number of from about 25 to about 300 with acid numbers below 5. The most preferred molecular weight range is from 1,000 to 5,000 with hydroxyl numbers ranging from 40 to 150 and acid numbers of 0 to about 5.

Any suitable organic polyisocyanate may be used in the process of the present invention for the preparation of polyurethane plastics including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene - 1,2 - diisocyanate, cyclohexylene - 1,2 - diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-napthylene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthylene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

The preparation of cellular polyurethane plastics is an area where the invention finds its greatest advantage and for this purpose an organic polyisocyanate is reacted with a polyester prepared in accordance with the process of the invention which has a plurality of free hydroxyl groups in the presence of a blowing agent. A particularly desirable organic polyisocyanate is unrefined diphenyl methane diisocyanate obtained from the phosgenation of diamino diphenylmethane without separation of the crude polymeric by-products.

For the preparation of the cellular polyurethane plastics it is preferred to carry out the reaction in the presence of a catalyst including for example, tertiary amines, such as triethylene diamine, N-ethyl morpholine, N-methyl morpholine, diethyl ethanolamine, N-coco morpholine, 1-methyl-4-dimethyl amino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like or a suitable metal catalyst such as those disclosed in U.S. Patent 2,846,408 and particularly iron acetyl acetonate or tin salts of carboxylic acids such as, for example, dibutyl tin di-2-ethyl hexoate, dibutyl tin dilaurate, stannous octoate, stannous oleate and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

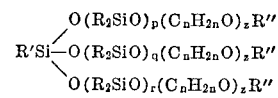

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

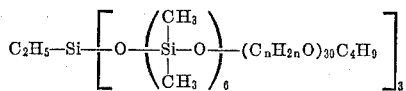

wherein $(C_nH_{2n}O)$ is a mixed polyoxyethylene and oxypropylene block copolymer containing about 17 oxyethylene units and about 13 oxypropylene units. In addition, coloring agents, fillers and the like may be used if they are desired. Suitable coloring agents are, for example, carbon black and suitable fillers are vermiculite, sawdust and the like. Due to their flame-resisting properties, the cellular polyurethane plastics of the invention are particularly useful in the preparation of insulation and may act as a substance with which to laminate two wall panels together and to produce a substantially rigid structure. For this purpose, considerable aromaticity should be built into the polyester and/or organic polyisocyanate and preferably if a substantially rigid cellular plastic is to result, the polyester should have a functionality of at least three. In other words, it should contain at least three free hydroxyl groups per molecule. Of course, polyesters having free carboxyl groups may also be used for the preparation of the cellular polyurethane plastics since the carboxyl group reacts with an isocyanato radical to produce carbon dioxide which is only beneficial in the production of the foam structure.

Suitable blowing agents for the production of the cellular polyurethane plastics include water and the halohydrocarbons such as dichlorodifluoromethane, trichlorofluoromethane and the like.

In accordance with another embodiment of the invention, coating compositions may be produced by reacting an organic polyisocyanate such as those disclosed above with the hydroxyl polyesters of the invention in an inert organic solvent therefor such as, for example, toluene, xylene, ethylene gylcol monethyl ether acetate and the like.

Polyurethane castings having flame-resistant properties may be prepared by reacting an excess of the organic polyisocyanate with the hydroxyl polyester under substantially anhydrous conditions in a first step and then reacting the resulting isocyanato terminated prepolymer in a second step with an organic chain-extending agent such as, for example, a polyhydric alcohol or polyamine having a molecular weight below about 500 and including, for example, ethylene diamine, propylene diamine, 4,4'-diamino diphenylmethane, 4,4'- dihydroxy diphenyl dimethyl methane, 1,4-butane diol, 1,6-hexane diol and the like.

The polyesters of the invention may be used for the preparation of copolymers by reaction with ethylenically unsaturated compounds provided that they contain some unsaturation. Suitable copolymerizable ethylenically unsaturday compounds include monomeric compounds, for example, styrene, methyl methacrylate, diallyl phthalate, tetrachlorophthalic acid diallyl ester and the like.

The plastics of the invention are useful for the preparation of either sound or thermal insulation, for the preparation of castings and moldings including gear wheels and the like and for the coating of various substrates such as, for example, wood, metal such as steel and the like.

The invention is further illustrated by the following examples in which the parts are by weight unles otherwise indicated.

Example 1

(A) About 19 parts of ditertiary butyl perxoide are added to about 702 parts of castor oil and about 552 parts of diethyl phosphite and the mixture is heated for about 10 hours at about 115° C. After adding further about 19 parts of ditertiary butyl peroxide, heating is continued for approximately a further 10 hours at about 115° C. The diethyl phosphite which has not been added is distilled off in vacuo at a temperature of about 120° C. and finally at a pressure of about 0.1 mm. Hg. About 1021 parts of an oily substance containing about 8.6 percent of phosphorous is obtained.

(B) About 80 parts of the oil of Example 1(A) and about 20 parts of glycerol are mixed with about 3 parts of N-methyl-N'-dimethyl amino ethyl piperazine, about 4 parts of sodium castor oil sulphate (water content about 50 percent), about 0.5 part of a polysiloxane-polyalkylene glycol ester having the formula

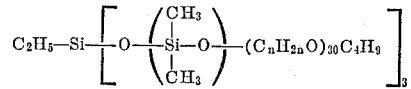

wherein $(C_nH_{2n}O)$ is a mixed polyoxyethylene and oxypropylene block copolymer containing about 17 oxyethylene units and about 13 oxypropylene units and about 155 parts of diphenyl methane-4,4'-diisocyanate. The foam plastic obtained from the liquid reaction mixture has a density of about 41 kg./m.³, a heat distortion point of about 150° C., a compression resistance of about 2.5 kg./cm.² and a water uptake after about 24 hours storage under water of about 1.4 percent. It has good flame-resistant properties.

Example 2

(A) About 953 parts of castor oil and about 220 parts of dimethyl phosphite are heated twice for about 10 hours each at about 85 to about 90° C. after adding in each case about 10 parts of dibenzoyl peroxide (about 50 percent in dibutyl phthalate). The unreacted dimethyl phosphite is distilled off at a bath temperature of about 25° C. and a pressure of about 0.1 mm. Hg. The residue obtained consists of about 1082 parts of an oil with an acid number of about 14 and an hydroxyl number of about 108. About 127.5 parts of bromine are added drop by drop at about 40° C. to about 953 parts of this phosphorylated castor oil. The mixture is stirred for about one hour at about 40° C. and volatile constituents are removed by evacuation at about 15 mm. Hg. About 1065 parts of a product containing about 3.1 percent phosphorous and about 10.5 percent bromine are obtained. The acid number is about 26, the hydroxyl number about 95.

(B) About 80 parts of the resulting product of Example 2(A) and about 20 parts of N,N,N',N'-tetrakis-(hydroxypropyl)-ethylene diamine (about 21 percent OH) are mixed with about 3 parts of N-methyl-N'-dimethyl amino ethyl piperazine, about 0.5 part of the polysiloxane-polyalkylene glycol ester of Example 1(B), about 4 parts of sodium castor oil sulphate (water content about 50 percent) and about 156 parts of diphenylmethane-4,4'-diisocyanate. The flame-resistant foam plastic obtained from the liquid reaction mixture has a heat distortion point of about 154° C., a density of about 41 kg./m.³, a pressure resistance of about 1.8 kg./cm.², and an impact strength of about 0.4 cm. kg./cm.². The uptake of water after about 24 hours storage under water is about 1.4 percent.

Example 3

(A) About 953 parts of castor oil and about 220 parts of dimethyl phosphite are reacted together as described in Example 2(A). After removing the volatile constituents, about 218 parts of bromine are added drop by drop at about 40° C. After evacuating at about 40° C. and about 10 mm. Hg pressure, a product containing about 3 percent phosphorous, and about 16 percent bromine, and having an acid number of about 27 and an hydroxyl number of about 85 is obtained.

(B) About 80 parts of the resulting product of Example 3(A) and about 20 parts of glycerol are mixed with about 3 parts of N-methyl-N'-dimethyl amino ethyl piperazine, about 4 parts of sodium castor oil sulphate (water content about 50 percent), about 0.5 part of the polysiloxane-polyalkylene glycol ester of Example 1(B) and about 154 parts diphenylmethane-4,4'-diisocyanate. The foam plastic obtained from the liquid reaction mixture has a density of about 39 kg./m.³, a resistance to bending up to about 138° C., a pressure resistance of about 1.3 kg./cm.² and a water uptake after about 24 hours storage under water of about 0.8 percent. It has good flame-resistant properties.

Example 4

(A) About 1321 parts of propoxylated trimethylolpropane (hydroxyl number about 390) are condensed with about 150.5 parts of maleic acid anhydride, until an acid number of about 5 is obtained. About 168.5 parts of dimethyl phosphite are added to the resulting polyester and a concentrated sodium methylate solution is then slowly added in small portions until the exothermic addition reaction is completed. Volatile constituents are removed by briefly subjecting to a vacuum of about 10 mm. Hg at about 80° C. A polyester is obtained which has an hydroxyl number of about 190 and an phosphorous content of about 3 percent.

(B) A mixture consisting of about 40 parts of the resulting product of Example 4(A), about 40 parts of a brominated maleic acid ethylene glycol polyester (OH number about 310, bromine content about 26 percent) and about 20 parts of N,N,N',N'-tetrakis-(hydroxypropyl)-ethylene diamine (about 21 percent OH) is mixed with about 1.0 part of N-methyl-N'-dimethyl amino ethyl piperazine, about 4 parts of sodium castor oil sulphate (water content about 50 percent), about 0.5 part of a polysiloxane-polyalkylene glycol ester of Example 1(B) and about 146 parts of diphenylmethane-4,4'-diisocyanate. The flame-resistant foam plastic obtained from the liquid reaction mixture has a resistance to bending up to about 160° C., a density of about 68 kg./m.³, a pressure resistance of about 5.7 kg./cm.² and an impact resistance of about 0.6 cm. kg./cm.². The water uptake after about 24 hours storage under water is about 0.8 percent.

Example 5

A mixture of about 35 parts of the polyester obtained in Example 4(A) (OH number about 190), about 35 parts of a brominated polyester consisting of about 29.4 parts of maleic acid anhydride and about 265 parts of propoxylated trimethylolpropane (—OH number about 390) and about 30 parts of N,N,N',N'-tetrakis-(hydroxypropyl)-ethylene diamine (about 21 percent —OH) is mixed with about 1.0 part N-methyl-N'-dimethyl amino ethyl piperazine, about 0.5 part of the polysiloxane-polyalkylene glycol ester of Example 1(B), about 40 parts of trichloromonofluoromethane and about 100 parts of diphenylmethane-4,4'-diisocyanate. The foam plastic obtained from the liquid reaction mixture has good flame-resistance and has a resistance to bending up to about 140° C., a density of about 26 kg./m.³, a pressure resistance of about 1.4 kg./cm.² and an impact strength of about 0.3 cm. kg./cm.². The water uptake after about 24 hours storage under water is about 3.0 percent and the thermal conductivity is about 0.021 kilocal/meter/° C.

Example 6

About 1500 parts of a propoxylated trimethylolpropane (hydroxyl number about 480) and about 196 parts of maleic acid anhydride are condensed in the usual manner until an acid number of below about 10 is obtained. The resulting polyester (hydroxyl number about 320) is subdivided into two equal parts. To one half are added about 100 parts of dimethyl phosphite and to the other half, about 145 parts of bromine.

A mixture containing about 35 parts of the phosphorous-containing or bromine-containing polyester and about 30 parts of N,N,N',N'-tetrakis-(hydroxypropyl) ethylene diamine (about 21 percent —OH) are mixed with about 0.2 part of endoethylenepiperazine, about 2 parts of sodium castor oil sulphate (about 50 percent water content), about 0.5 part of the polysiloxane-polyalkylene glycol ester of Example 1(B), about 40 parts of trichloromonofluoromethane and about 132 parts of diphenylmethane-4,4'-diisocyanate. The foam plastic produced from the liquid reaction mixture and having good flame-resistant properties has a bending resistance on heating up to about 152° C., a density of about 24 kg./m.³, a pressure resistance of about 1.4 kg./cm.² and an impact resistance of about 0.4 cm. kg./cm.². The water uptake after about 24 hours storage under water is about 2.8 percent and the thermal conductivity is about 0.020 kilocal/meter/hour/° C.

Example 7

About 50 parts of the phosphorus-containing or bromine-containing polyester of Example 6 are dissolved in about 100 parts of butyl acetate. This solution is mixed with about 150 parts of the reaction product from about 1 mol trimethylolpropane and about 3 mols of a mixture of 65 percent 2,4- and 35 percent 2,6-toluylene diisocyanate (in the form of about a 75 percent solution in ethyl acetate) and about 0.5 part polyvinyl acetal as additive. The mixture is applied in a thin layer on a wooden slab. After drying for about 60 hours at room temperature, a scratch-resistant, glassy, difficulty inflammable lacquer film is obtained.

It is to be understood that the foregoing working examples are for the purpose of illustration and that any other suitable polycarboxylic acid, polyhydric alcohol, dialkyl phosphite, organic polyisocyanate, catalyst, stabilizer or the like could have been used therein with satisfactory results provided that the teachings of the disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A phosphorous-containing polymeric product of the reaction of components comprising (I) a dialkyl phosphite of the formula

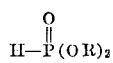

wherein R is a lower alkyl radical, and (II) an unsaturated alkyd resin containing aliphatic carbon-to-carbon double bonds that are conjugated with carbonyl groups, the reaction being conducted in the presence of an alkaline catalyst which will cause addition of a dialkyl phosphite to an ethylenically unsaturated double bond.

2. Polyesters adapted for the preparation of flame-resistant plastics which comprises the reaction product of a dialkyl phosphite with an ethylenically unsaturated hydroxyl polyester prepared by a process which comprises condensing a polycarboxylic acid and a polyhydric alcohol, in the presence of an alkaline catalyst, an organic peroxide or an azoisobutyric acid dinitrile catalyst which will cause the addition of a dialkyl phosphite to an ethylenically unsaturated double bond, at least one member selected from the group consisting of said polycarboxylic acid and said polyhydric alcohol containing an ethylenically unsaturated double bond.

3. A polyester suitable for the preparation of polyurethane plastics prepared by a process which comprises reacting castor oil with a dialkyl phosphite in the presence of an alkaline catalyst, an organic peroxide catalyst or an azoisobutyric acid dinitrile catalyst which will cause the addition of a dialkyl phosphite to an ethylenically unsaturated double bond.

4. The polyester of claim 3 wherein said catalyst is an organic peroxide.

5. A polyurethane plastic prepared by a process which comprises reacting an organic polyisocyanate with a phosphorus containing polymeric product of the reaction of components comprising (I) a dialkyl phosphite of the formula

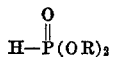

wherein R is a lower alkyl radical, and (II) an unsaturated alkyd resin containing aliphatic carbon-to-carbon double bonds that are conjugated with carbonyl groups, the reaction being conducted in the presence of an alkaline catalyst which will cause addition of a dialkyl phosphite to an ethylenically unsaturated double bond, said alkyd resin containing a plurality of free hydroxyl groups.

6. A polyurethane plastic prepared by a process which comprises reacting an organic polyisocyanate with a polyester which comprises the reaction product of a dialkyl phosphite with an ethylenically unsaturated hydroxyl polyester prepared by a process which comprises condensing a polycarboxylic acid and a polyhydric alcohol, in the presence of an alkaline catalyst, an organic peroxide catalyst or an azoisobutyric acid dinitrile catalyst which will cause the addition of a dialkyl phosphite to an ethylenically unsaturated double bond, at least one member selected from the group consisting of said polycarboxylic acid and said polyhydric alcohol containing an ethylenically unsaturated double bond.

7. A polyurethane plastic prepared by a process which comprises reacting an organic polyisocyanate with a polyester prepared by a process which comprises reacting castor oil with a dialkyl phosphite in the presence of an alkaline catalyst, an organic peroxide, catalyst or an azoisobutyric acid dinitrile catalyst which will cause the addition of a dialkyl phosphite to an ethylenically unsaturated double bond.

8. The polyurethane plastic of claim 6 wherein a blowing agent is included to prepare a cellular polyurethane plastic.

9. A cellular polyurethane plastic prepared by a process which comprises reacting, in the presence of a blowing agent, an organic polyisocyanate with an hydroxyl polyester prepared by a process which comprises reacting a dialkyl phosphite with castor oil in the presence of an alkaline catalyst, an organic peroxide catalyst or an azoisobutyric acid dinitrile catalyst which will cause the addition of a dialkyl phosphite to an ethylenically unsaturated double bond.

10. The cellular polyurethane of claim 9 wherein said castor oil and said dialkyl phosphite are reacted in the presence of an organic peroxide.

11. The cellular polyurethane plastic of claim 10 wherein said peroxide is dibenzoyl peroxide.

References Cited
UNITED STATES PATENTS

| | | | |
|---|---|---|---|
| 2,824,085 | 2/1958 | Cummings | 260—870 |
| 3,189,628 | 6/1965 | Knight et al. | 260—403 |
| 3,236,787 | 2/1966 | Jones et al. | 260—2.5 |
| 2,957,931 | 10/1960 | Hamilton et al. | 260—403 |
| 2,988,558 | 6/1961 | Swern et al. | 260—403 |
| 2,948,691 | 8/1960 | Windemuth et al. | 260—2.5 |
| 2,949,431 | 8/1960 | Britain | 260—2.5 |

SAMUEL H. BLECH, *Primary Examiner.*